(12) United States Patent
Perry

(10) Patent No.: US 12,015,131 B2
(45) Date of Patent: Jun. 18, 2024

(54) ELECTROCHEMICAL HEAT TRANSFER SYSTEM

(71) Applicant: CARRIER CORPORATION, Palm Beach Gardens, FL (US)

(72) Inventor: Michael L. Perry, Groton, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 836 days.

(21) Appl. No.: 17/258,317

(22) PCT Filed: Jun. 27, 2019

(86) PCT No.: PCT/US2019/039544
§ 371 (c)(1),
(2) Date: Jan. 6, 2021

(87) PCT Pub. No.: WO2020/009901
PCT Pub. Date: Jan. 9, 2020

(65) Prior Publication Data
US 2021/0199396 A1    Jul. 1, 2021

Related U.S. Application Data

(60) Provisional application No. 62/694,782, filed on Jul. 6, 2018.

(51) Int. Cl.
*F25B 27/00*     (2006.01)
*C09K 5/04*      (2006.01)
(Continued)

(52) U.S. Cl.
CPC ............. *H01M 10/60* (2015.04); *C09K 5/048* (2013.01); *C09K 5/16* (2013.01); *C25B 9/17* (2021.01); *F28D 15/025* (2013.01)

(58) Field of Classification Search
CPC ........ C25B 9/17; F28D 15/025; H01M 10/60; C09K 5/048; C09K 1/16
(Continued)

(56) References Cited

U.S. PATENT DOCUMENTS 6,321,561 B1   11/2001   Maget
8,769,972 B2    7/2014   Bahar
(Continued)

FOREIGN PATENT DOCUMENTS

EA          028372 B1 * 11/2017
WO     2010126984 A2   11/2010
WO     2020009901 A1    1/2020

OTHER PUBLICATIONS

Darling, et al., "Half-Cell, Steady-State Flow-Battery Experiments", ECS Transactions, 53 (7), p. 31-38 (2013).
(Continued)

*Primary Examiner* — Davis D Hwu
(74) *Attorney, Agent, or Firm* — CANTOR COLBURN LLP

(57) ABSTRACT

A heat transfer system is disclosed including heat transfer fluid flow paths (20,22,24,28) through a heat exchanger evaporator (12) and a heat exchanger condenser (16). The system includes an electrochemical cell (32) that transforms an electrochemically reactive agent in the heat transfer fluid between first and second compounds having different boiling points. In some embodiments, the electrochemically active agent can include a fluorinated organic compound including an electrochemically active substituent group that reversibly transforms between the first and second compounds. In some embodiments, the heat transfer fluid can include the electrochemically active agent and an electrochemically non-active refrigerant in a mixture.

20 Claims, 1 Drawing Sheet

(51) Int. Cl.
*C09K 5/16* (2006.01)
*C25B 9/17* (2021.01)
*F28D 15/02* (2006.01)
*H01M 10/60* (2014.01)

(58) Field of Classification Search
USPC ........................................................ 62/238.1
See application file for complete search history.

(56) References Cited

U.S. PATENT DOCUMENTS

| | | | |
|---|---|---|---|
| 9,166,243 | B2 | 10/2015 | Perry |
| 9,464,822 | B2 | 10/2016 | Bahar |
| 9,574,796 | B2 | 2/2017 | Kempiak |
| 9,599,364 | B2 | 3/2017 | Bahar et al. |
| 9,738,981 | B2 | 8/2017 | Naugler et al. |
| 9,797,635 | B2 | 10/2017 | Junge |
| 2009/0044752 | A1* | 2/2009 | Furuya ............... H01J 37/32091 118/723 E |
| 2012/0304673 | A1 | 12/2012 | Betts |
| 2015/0241091 | A1 | 8/2015 | Bahar |
| 2016/0195305 | A1 | 7/2016 | Junge |
| 2016/0195306 | A1 | 7/2016 | Junge et al. |
| 2017/0082328 | A1 | 3/2017 | Bahar |
| 2017/0362720 | A1 | 12/2017 | Bahar et al. |
| 2018/0119996 | A1 | 5/2018 | Junge et al. |

OTHER PUBLICATIONS

International Search Report for International Application No. PCT/US2019/039544; Application Filing Date: Jun. 27, 2019; dated Dec. 17, 2019, 5 pages.
James, et al., "Investigation of Chemical Looping for High Efficiency Heat Pumping", Purdue Engineering, Jan. 9, 2017, 27 pages.
James, et al., "Thermodynamic Analysis of an Electrochemically Driven Chemical Looping Heat Pump" (2016). International Refrigeration and Air Conditioning Conference. Paper 1745. 11 pages.
James, et al., "Thermodynamic Analysis of an Electrochemically Driven Chemical Looping Heat Pump", 16th International Refrigeration and Air Conditioning Confernece at Purdue, Jul. 11-14, 2016, 2424, 10 pages.
Siegel, "Better compression for a lasting impression", Eniday, 2011, https://www.eniday.com/en/author/RP-Siegel-80/; 3 pages.
Written Opinion for International Application No. PCT/US2019/039544; Application Filing Date: Jun. 27, 2019; dated Dec. 17, 2019, 9 pages.

\* cited by examiner

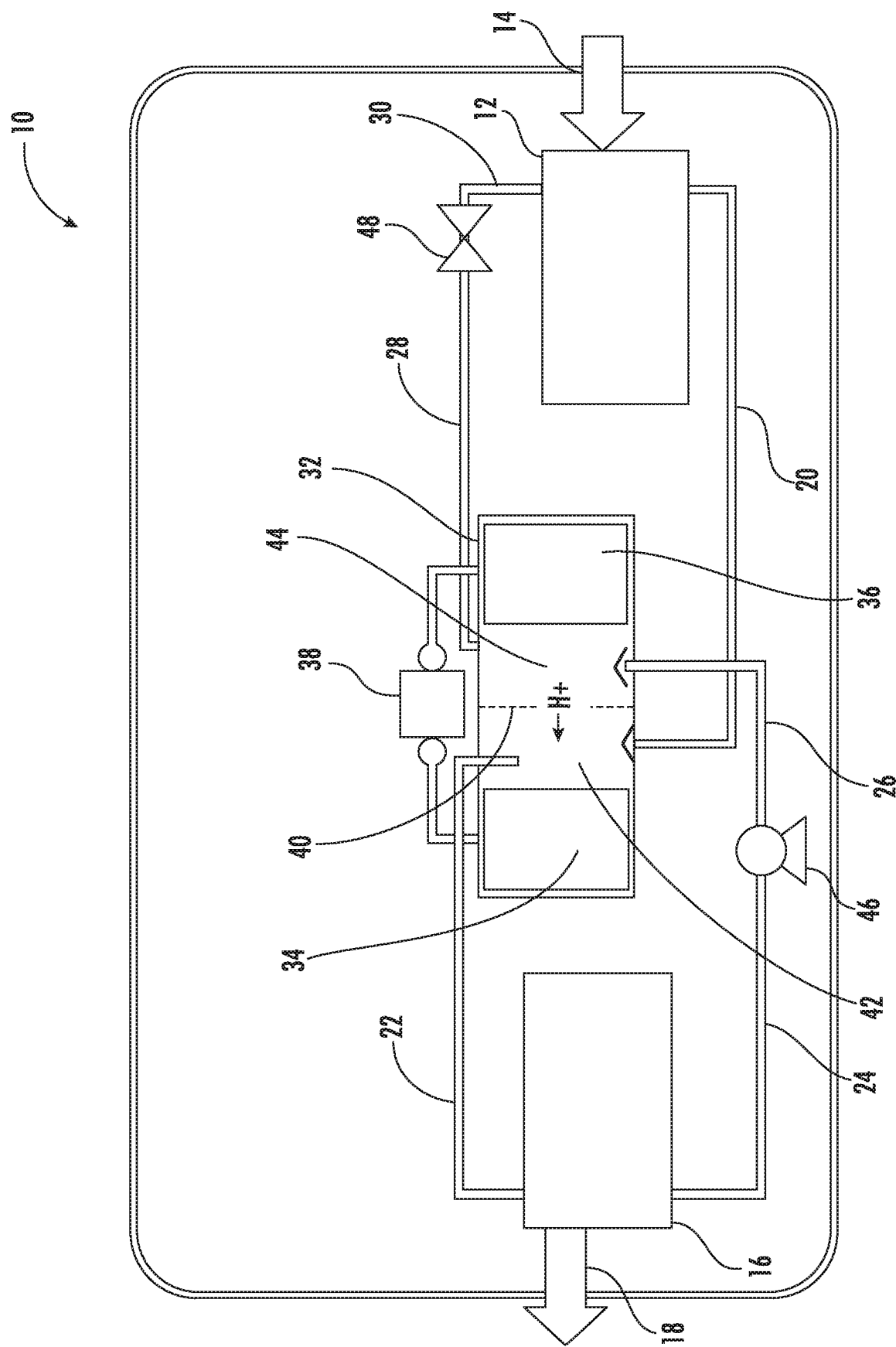

ELECTROCHEMICAL HEAT TRANSFER SYSTEM

CROSS REFERENCE TO RELATED APPLICATIONS

This application is a National Stage application of PCT/US2019/039544, filed Jun. 27, 2019, which claims the benefit of U.S. Provisional Application No. 62/694,782, filed Jul. 6, 2018, both of which are incorporated by reference in their entirety herein.

BACKGROUND

Exemplary embodiments relate to heat transfer, and particularly to a heat transfer system utilizing an electrochemical cell.

A wide variety of technologies exist for heating and/or cooling applications. One of the most prevalent technologies in use for residential and commercial refrigeration and air conditioning is the vapor compression refrigerant heat transfer loop. These loops typically circulate a refrigerant having appropriate thermodynamic properties through a loop that comprises a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, vapor compression refrigerant loops can have limitations on efficiency, reliability, or have other issues such as noise from various mechanical components such as compressors needed for operation of the refrigerant loop.

Accordingly, there has been interest in developing alternative heat transfer technologies. Various technologies have been proposed; however, further alternatives to conventional vapor compression refrigeration cycles are still desired.

BRIEF DESCRIPTION

A heat transfer system is disclosed. The system includes an electrochemical cell comprising a first electrode and a second electrode separated by a separator comprising an ion transfer medium, a first electrode fluid flow path in operative fluid communication with the first electrode between a first electrode fluid flow path inlet and a first electrode fluid flow path outlet, and a second electrode fluid flow path in operative fluid communication with the second electrode between a second fluid flow path inlet and a second fluid flow path outlet. A heat exchanger condenser including a heat rejection side is in operative thermal communication with a heat sink. A heat exchanger evaporator including a heat absorption side is in operative thermal communication with a heat source. A first heat transfer fluid flow loop is disposed from the first electrode fluid flow path outlet to a heat rejection side inlet of the heat exchanger condenser and from a heat rejection side outlet of the heat exchanger condenser to the second electrode fluid flow path inlet. A second heat transfer fluid flow loop is disposed from the second electrode fluid flow path outlet to a heat absorption side inlet of the heat exchanger evaporator, and from a heat absorption side outlet of the heat exchanger evaporator to the first electrode fluid flow path inlet. A heat transfer fluid is disposed in the first and second heat transfer fluid flow loops, comprising an electrochemically active agent that reversibly transforms from a first compound to a second compound at the second electrode, and from the second compound to the first compound at the first electrode. In some embodiments, the electrochemically active agent comprises a fluorinated organic compound including an electrochemically active substituent group, which reversibly transforms between said first and second compounds having different boiling points to provide a phase change of the first and second compounds in the heat exchanger condenser and in the heat exchanger evaporator. In some embodiments, the heat transfer fluid comprises the electrochemically active agent and an electrochemically non-active refrigerant in a mixture, wherein the electrochemically active agent reversibly transforms between the first and second compounds to provide different boiling points of the mixture and a phase change of the electrochemically non-active refrigerant in the heat exchanger condenser and in the heat exchanger evaporator.

A method of transferring heat is disclosed. According to the method, a heat transfer fluid comprising an electrochemically active agent is evaporated in a heat exchanger evaporator by absorbing heat from a heat source. Evaporated heat transfer fluid is directed from the heat exchanger evaporator to a first electrode fluid flow path in an electrochemical cell. The electrochemically active agent is electrochemically reacted on the first electrode fluid flow path to convert at least a portion of the electrochemically active agent from a first compound to a second compound that has a lower boiling point than the first compound. The heat transfer fluid including the electrochemically active agent is directed to a heat exchanger condenser, and condensed, rejecting heat to a heat. Condensed heat transfer fluid including the electrochemically active agent is moved to a second electrode fluid flow path in the electrochemical cell. The electrochemically active agent is electrochemically reacted on the second electrode fluid flow path to convert at least a portion of the electrochemically active agent from the second compound to the first compound, and the heat transfer fluid including the electrochemically active agent is moved from the second electrode fluid flow path to the heat exchanger evaporator. In some embodiments, the electrochemically active agent comprises a fluorinated organic compound including an electrochemically active substituent group, which reversibly transforms between said first and second compounds having different boiling points to provide a phase change of the first and second compounds in the heat exchanger condenser and in the heat exchanger evaporator. In some embodiments, the heat transfer fluid comprises the electrochemically active agent and an electrochemically non-active refrigerant in a mixture, wherein the electrochemically active agent reversibly transforms between the first and second compounds to provide different boiling points of the mixture and a phase change of the electrochemically non-active refrigerant in the heat exchanger condenser and in the heat exchanger evaporator.

In some embodiments the electrochemically active agent comprises a fluorinated organic compound including an electrochemically active substituent group.

According to any one or combination of the above embodiments, the electrochemically active substituent group can include a carbonyl group that is electrochemically converted to a hydroxyl group.

According to any one or combination of the above embodiments, the first and second compounds can be characterized by the formula: $[R][(C=O)]_m[F]_n \leftrightarrow [R][(C-OH)]_m[F]_n$, wherein R represents atoms, along with the other components of the formula, to form an organic compound comprising 1 to 5 carbon atoms, m is 1 or 2, and n is an integer from 1 to a number of available carbon atom valences on R.

According to any one or combination of the above embodiments, n can equal the number of available valences on R.

According to any one or combination of the above embodiments, the electrochemically active agent can include hexafluoroacetone and hexafluoroisopropanol as the first and second compounds, respectively.

In some embodiments, the heat transfer fluid comprises the electrochemically active agent and an electrochemically non-active refrigerant in a mixture.

According to any one or combination of the above embodiments, the electrochemically active substituent group can include a carbonyl group that is electrochemically converted to a hydroxyl group.

According to any one or combination of the above embodiments, the first and second compounds can be characterized by the formula: $[R'][(C=O)]_m \leftrightarrow [R'][(C-OH)]_m$, wherein R' represents atoms, along with the other components of the formula, to form an organic compound comprising 1-20 carbon atoms, and m is 1 or 2.

According to any one or combination of the above embodiments, the first and second compounds can be characterized by the formula: $[R''][(C=O)]_m[F]_q \leftrightarrow [R''][(C-OH)]_m[F]_q$, wherein R" represents atoms, along with the other components of the formula, to form an organic compound comprising 1-20 carbon atoms, m is 1 or 2, and q is an integer from 0 to a number of available carbon atom valences on R".

According to any one or combination of the above embodiments, the electrochemically non-active refrigerant can comprise a fluorinated olefin.

According to any one or combination of the above embodiments, the electrochemically active substituent group can include a carbonyl group that is electrochemically converted to a hydroxyl group.

According to any one or combination of the above embodiments, the electrochemically active agent can include a substituted or unsubstituted quinone/hydroquinone.

According to any one or combination of the above embodiments, the electrochemically non-active refrigerant can have a molecular dipole moment of greater than 1 debye unit, and a boiling point of greater than 0° C. at atmospheric pressure.

According to any one or combination of the above embodiments, the heat transfer fluid can comprise a plurality of different electrochemically active agents.

BRIEF DESCRIPTION OF THE DRAWING

The following descriptions should not be considered limiting in any way. With reference to the accompanying drawing:

The FIGURE shows an example embodiment of a heat transfer system.

DETAILED DESCRIPTION

A detailed description of one or more embodiments of the disclosed apparatus and method are presented herein by way of exemplification and not limitation with reference to the FIGURES.

With reference now to the FIGURE, an example embodiment of a heat transfer system 10 is shown. As shown in the FIGURE, the system includes a heat exchanger evaporator 12 in operative thermal communication (represented by thermal flow path 14) with a heat source such as a conditioned space (not shown), and a heat exchanger condenser 16 in operative thermal communication (represented by thermal flow path 18) with a heat sink such as an external (e.g., outdoor) space (not shown). The designation of an outdoor space as a heat sink and a conditioned (e.g., indoor) space as a heat source is indicative of operation of the heat transfer system 10 in a refrigeration or air conditioning mode. It is noted, however, that the heat transfer system 10 can also be operated in a heat pump mode in which the conditioned space is a heat sink and the external space is a heat source. The heat exchanger evaporator 12 and the heat exchanger condenser 16 are connected in a fluid flow loop including flow paths or conduits 20, 22, 24, 26, 28, and 30, as described in greater detail below. The heat transfer system 10 also includes an electrochemical cell stack 32. Unlike conventional vapor compression heat transfer systems that rely on changes in the pressure of a refrigerant flowing through a heat transfer loop to provide different refrigerant boiling points at different locations in the system, the heat transfer systems described herein such as the heat transfer system 10 use an electrochemical cell as a mechanism (alone or in combination with pressure-induced boiling point changes) to reversibly transform an electrochemically active agent between first and second compounds having different boiling points. The electrochemical cells include a first electrode and a second electrode separated by an ion transfer medium to reversibly transform an electrochemically active agent between the first and second compounds.

With continued reference to the FIGURE, the electrochemical cell 32 includes a plurality of cathodes 34 (schematically represented as a single cathode) and a plurality of anodes 36 (schematically represented as a single anode) electrically connected to a power source 38 and physically separated by ion transfer medium such as a ion exchange membrane (IEM) 40. This IEM may be either a cation-exchange membrane, such as a proton-exchange membrane (PEM), or it may be an anion-exchange membrane. A cathode side fluid flow path 42 in operative fluid communication with the cathodes 34, and an anode side fluid flow path 44 in operative fluid communication with the anodes 36, each form part of a heat transfer fluid flow loop as described above. As mentioned above, the heat transfer fluid of the heat transfer system 10 includes an electrochemically active agent that reversibly transforms between first and second compounds with different boiling points. This reactive transformation results from passage of the fluid through the cathode side and anode side fluid flow paths 42 and 44, where it is subjected to electrochemical reactions. On the anode, the electrochemically active agent will be oxidized and on the cathode the electrochemically active agent will be reduced back to the original molecule.

The operation of the heat transfer system 10 is described in greater detail below with respect to a transformation of molecular oxygen substituent(s) between a carbonyl form and a hydroxyl form, initiated by addition of a proton at the cathode fluid flow path 40 or removal of a proton at the anode fluid flow path 42. It is noted, however, that the heat transfer system 10 is one example embodiment and that other types of electrochemical cells and/or electrochemically active agents are contemplated as discussed in greater detail below. With respect to the example embodiment heat transfer system 10, a heat transfer fluid including vapor produced in the heat exchanger evaporator 12 is moved (e.g., transported by motive force from a pump) through conduit 20 to a cathode side inlet of the cathode side fluid flow path 42 where a carbonyl group on the electrochemically active agent reacts with protons emerging from the proton exchange membrane 40 and is converted to a hydroxyl group. This chemical change increases the boiling point of the heat transfer fluid to a target level suitable for the application (e.g., 15° C.-30° C. for use in an air conditioner/heat pump for HVAC systems). The high boiling point heat transfer fluid is moved from the cathode side fluid flow path 42 through conduit 22 to the heat exchanger condenser 16 where the vapor is condensed and heat is rejected along the thermal flow path 18 (e.g., to the outside for air conditioning or to a conditioned space for heat pump use). High boiling point liquid heat transfer fluid is moved through conduit 24 to an inlet of pump 46, and is pumped through conduit 26 to an inlet to the anode side fluid flow path 44 where protons are electrochemically stripped at the anode 36 and electrically directed across the ion exchange membrane 40. Removal of the proton chemically transforms the hydroxyl substituent on the electrochemically active agent back to the original carbonyl group, resulting in a reduction of the heat transfer fluid boiling point to a target level suitable for the application (e.g., 0° C.-15° C. for use in an air conditioner/heat pump for HVAC systems). Low boiling point liquid heat transfer fluid is transported through conduit 28 through an optional flow control pressure reduction device 48, and then through conduit 30 to the heat exchanger evaporator 12 where heat transfer fluid is evaporated and heat absorbed from the thermal flow path 14 (e.g., from a conditioned space for air conditioning or from the outside for heat pump use).

Various types of electrochemically active agents can be used in the heat transfer fluid. For example embodiments utilizing an electrochemically-initiated transformation between ketones or aldehydes, as examples of molecules with carbonyl groups, and alcohols or glycols, which would be the corresponding molecules with hydroxyl groups. Some example electrochemically active agents can include (referencing only the carbonyl version name for ease of description) ketones, aldehydes, quinones, enones, and their corresponding reduced forms where the carbonyl group is converted to a hydroxyl group. In some embodiments, the electrochemically active agent can include fluorinated molecules, since these can have sufficiently low boiling points that are desirable for this application without having to operate the system at extremely low operating pressures. For example, fluorinated alcohol-aldehyde couples are good candidates since alcohols have exceptionally higher boiling points than the corresponding ketones due to hydrogen bonding in the hydroxyl groups of the alcohols, which are not present in the ketones.

In some embodiments, the electrochemically active agent can function as a volatile refrigerant that provides boiling points in the target temperature rage at operating pressure of the condenser or evaporator, respectively. In some embodiments, an electrochemically active volatile refrigerant can be characterized by the formula: $[R][(C=O)]_m[F]_n \leftrightarrow [R][(C-OH)]_m[F]_n$, wherein R represents atoms, along with the other components of the formula, to form an organic compound comprising 1 to 5 carbon atoms, m is 1 or 2, and n is an integer from 1 to the number of available carbon atom valences on R. In some embodiments, R can be a hydrocarbon core molecular structure in which some or all hydrogen atoms have been replaced with the specified carbonyl oxygen and fluoro substituents, and optionally other substituents as well. Examples of specific compounds include hexafluoroisopropanol (boiling point at 1 atm is 58° C.), with the corresponding ketone being hexafluoroacetone (boiling point at 1 atm is minus 28° C.). The change in boiling point (or "lift") between these two molecules is therefore >85° C., which results from the reduction/oxidation reaction.

In some embodiments the working fluid can also be a blend of materials including an electrochemically reactive component that is mixed or dissolved in another fluid. In some embodiments, an electrochemically reactive component can be blended with a volatile refrigerant (which does not have to itself be electrochemically active, and in some embodiments is electrochemically non-active), which provides boiling points in the target temperature rage at operating pressure of the condenser or evaporator, respectively. Virtually any conventional refrigerant can be used, including but not limited to substituted or unsubstituted hydrocarbons of 1 to 5 carbon atoms. In some embodiments, a hydrocarbon refrigerant can include an unsaturated bond (e.g., an olefin refrigerant). In some embodiments, a hydrocarbon refrigerant can be substituted with one or more halogen substituents, and in some embodiments a hydrocarbon refrigerant can be substituted with one or more fluoro substituents. In some embodiments, a hydrocarbon refrigerant can be substituted with fluoro substituents on at least half of available bonding sites (i.e., in place of hydrogen atoms) on carbon atoms of the molecule. In some embodiments, a hydrocarbon refrigerant can be substituted with fluoro substituents on all of the available bonding sites (i.e., in place of hydrogen atoms) on carbon atoms of the molecule. Examples of refrigerants include but are not limited to hydrochlorofluorocarbons (HCFCs), such as R22, hydrofluorocarbons (HFCs), such as R134a, R410A, R404A and R407C, hydrofluoroolefins such as R-1234ze or, R1234yf, hydrocarbons (e.g., propane), ammonia (R717) or carbon dioxide (R744).

In some embodiments, a refrigerant to be blended with an electrochemically active agent can have a high molecular dipole moment (as used herein, any reference to "dipole moment" shall refer to the molecular dipole moment) to maximize impact, i.e., degree of intermolecular bonding, of changing the dipole moment of the electrochemically active component. In such blends, the electrochemically active agent can but does not have to provide a boiling point in the target operating ranges of the evaporator or condenser. Although this disclosure is not limited to any particular theory or mode of operation, it is believed that in the case of blends, the reactions in the electrochemical cell can induce a change in the molecular dipole moment of the electrochemically active agent, i.e., the first and second compounds between which the electrochemically active agent alternates have different molecular dipole moments, which can impact a degree of formation of weak intermolecular bonds (analogous to hydrogen bonding in water) in the heat transfer fluid, which in turn impacts the boiling point of the blend fluid. A high molecular dipole moment can promote more intermolecular bonding, which in turn can promote a higher boiling point, and conversely a low molecular dipole moment can promote less intermolecular bonding, which in turn can promote a lower boiling point. In such embodiments, the electrochemically active agent does not even have to be volatile at the system operation temperatures and can remain in liquid (or dissolved solid) form throughout the heat transfer fluid flow loop.

In some embodiments, the non-reactive component in a blend can have a molecular dipole moment greater than 1 debye units and a boiling point of <0° C. at atmospheric pressure. Hydrofluoroolefins can perform well as non-reactive components, as they have a reasonably high dipole moment and very low boiling points. In some embodiments, the non-reactive refrigerant can be a hydrofluoroolefin of 3 to 5 carbon atoms substituted with only fluorine atoms and hydrogen atoms. Some examples include HFO-1234ze and HFO-1234yf.

A wide variety of electrochemically active agents can be used in combination with a non-reactive volatile refrigerant, including electrochemically active species that are solids, as they can be dissolved in the non-reactive component. For example, a quinone (such as benzoquinone, which is a solid) or a fluoro-substituted quinone (such as tetrafluoroquinone, which is a solid) can be dissolved into a conventional refrigerant (such as a hydrofluoro-olefin, e.g., HFO-1234ze or HFO-1234yf), and when this quinone is electrochemically converted to the corresponding hydroquinone (e.g., hydroquinone or tetrafluorobenzene diol, respectively) this will change the boiling point of this blend fluid. In some examples are set forth in the Table below, and the selection of a particular compound or compound to use can depend on the application, with the temperature ranges of the heat sink and the heat source being among the factors impacting the selection of an electrochemically active agent to enable a blend working fluid to have boiling points appropriate for the heat sink and heat source temperatures. In some embodiments, an electrochemically active agent or a mixture of electrochemically active agents can constitute all or substantially (e.g., except for additives and impurities) all of the heat transfer fluid. For example, hexafluoroacetone and hexafluoroisopropanol provide boiling points appropriate for an HVAC (heating, ventilation, and air conditioning) system and could be used as a sole refrigerant. Combinations of electrochemically active agents can be used as well.

Electrochemically Active Agent Compound Pairs

| Carbonyl Form | Hydroxyl Form |
| --- | --- |
| Hexafluoroacetone, $(CF_3)_2CO$, BP is minus 28° C. | Hexafluoroisopropanol or hexafluoro-2-propanol $(CF_3)_2CHOH$, BP 58° C. |
| Trifluoroacetone, $CF_3COCH_3$, BP 21-24° C. | 2,2,2-trifluoroethanol, $CF_3CH_2OH$, BP 74° C. |
| Benzoquinone, $C_6H_4O_2$ (solid at operating temperatures), dissolved in working fluid, such as hydrofluoro-olefin | Hydroquinone or benzene-1,4-diol or quinol, $C_6H_6O_2$ (solid at operating temperatures), dissolved in working fluid, such as hydrofluoro-olefin |
| Napthaquinone, $C_{10}H_6O_2$ (solid at operating temperatures), dissolved in working fluid, such as hydrofluoro-olefin | Dihydroxynapthalene or Naphtahlenediol or hydronapthoquinone, $C_{10}H_8O_2$ (solid at operating temperatures), dissolved in working fluid, such as hydrofluoro-olefin |
| Anthraquinone, $C_{14}H_8O_2$ (solid at operating temperatures), dissolved in working fluid, such as hydrofluoro-olefin | Dihydroanthraquinone, $C_{14}H_{10}O_2$ (solid at operating temperatures), dissolved in working fluid, such as hydrofluoro-olefin |
| Fluoranil or Tetrafluoro-1,4-benzoquinone, $C_6F_4O_2$ (solid at operating temperatures), dissolved in working fluid, such as hydrofluoro-olefin | Tetrafluoro-1,4-benzenediol, $C_6H_2F_4O_2$ (solid at operating temperatures), dissolved in working fluid, such as hydrofluoro-olefin | embodiments, the electrochemically active agent in a blend can be characterized by the formula: $[R][(C=O)]_m \leftrightarrow [R'][(C-OH)]_m$ where R' represents atoms, along with the other components of the formula, to form an organic compound comprising 1-20 carbon atoms and m is 1 or 2. In some embodiments, R' can be a hydrocarbon core molecular structure in which some or all hydrogen atoms have been replaced with the specified carbonyl oxygen and fluoro substituents, and optionally other substituents as well. In some embodiments, the electrochemically active agent in a blend can include fluoro substituents, and in some embodiments can be characterized by the formula: $[R''][(C=O)]_m[F]_q \leftrightarrow [R''][(C-OH)]_m[F]_q$, wherein R" represents atoms, along with the other components of the formula, to form an organic compound comprising 1-20 carbon atoms, m is 1 or 2, and q is an integer from 0 to the number of available carbon atom valences on R". In some embodiments, R" can be a hydrocarbon core molecular structure in which some or all hydrogen atoms have been replaced with the specified carbonyl oxygen and fluoro substituents, and optionally other substituents as well.

Virtually any alcohol/ketone or fluorinated any alcohol/ketone or other reactive group pairing with boiling points in the target range can be used. Alternatively, virtually any quinone/hydroquinone or other electrochemically-reactive group pairing that is dissolvable in a refrigerant to provide boiling points in the target range can be used. Some specific (boiling points at 1 atm)

In some embodiments, if the heat transfer system utilizes a combination of an electrochemically active agent and a non-reactive refrigerant, it can have two phase flow through the heat transfer loop as follows: low boiling point fluid in a two phase state (liquid and gas) produced in the heat exchanger evaporator 12 is transported through conduit 20 to the cathode side inlet of the cathode side fluid flow path 42 where a carbonyl group on the electrochemically active agent reacts with protons emerging from the proton exchange membrane 40 and is converted to a hydroxyl group. This chemical change increases the boiling point of the heat transfer fluid to a target level suitable for the application. The high boiling point heat transfer fluid, still in a liquid/gas two-phase state is transported from the cathode side fluid flow path 42 through conduit 22 to the heat exchanger condenser 16 where the vapor is condensed and heat is rejected along the thermal flow path 18. High boiling point single-phase liquid heat transfer fluid is transported through conduit 24 to an inlet of pump 46, and is pumped through conduit 26 to an inlet to the anode side fluid flow path 44 where protons are electrochemically stripped at the anode 36, resulting in a reduction of the heat transfer fluid boiling point to a target level suitable for the application. Low boiling point single-phase liquid heat transfer fluid is transported through conduit 28 through an optional pressure reduction device 48, and then through conduit 30 to the heat exchanger evaporator 12 where produces a two-phase (liquid and gas) mixture that exits the evaporator 12 on another cycle through the loop.

This disclosure makes reference to example embodiments; however, the disclosure is not limited to these specific examples, and different modifications or variations can be made. For example, although one of the technical benefits of the heat transfer system 10 is that it does not require a change in pressure (and the accompanying mechanical components such a compressor) to induce boiling point changes, the heat transfer system 10 or other heat transfer systems with electrochemically active agents through an electrochemical cell can be configured to operate, and can be operated with a different pressure on the high boiling point portion of the loop (i.e., the heat exchanger condenser 16 and conduits 22, 24, and 26) compared to the low boiling point portion of the loop (i.e., the heat exchanger evaporator 12 and conduits 28, 30, and 20). Such a pressure differential can help achieve targeted boiling point values in the system and in some embodiments can be controlled to account for conditions such ambient temperature conditions, or operator-set or system-set temperature for a conditioned space. A pressure differential can be provided by a gas or vapor compressor. Solid membrane ion transfer media such as ion exchange membranes can accommodate large pressure differences between the two sides. Also, the heat exchanger condenser 16 and the heat exchanger evaporator 12 are depicted in the FIGURE as separate components from the electrochemical cell or cell stack, but can be integrated with the cell into a single structure if the cell is in thermal communication with the heat source or heat sink. Additional components such as pumps (preferably located in single-phase liquid portions of the loop, or specially designed to handle two-phase flow), flow control valves, back-pressure valves, or other fluid management or measurement devices, can also be included.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat transfer system, comprising:
an electrochemical cell comprising a first electrode and a second electrode separated by a separator comprising an ion transfer medium, a first electrode fluid flow path in operative fluid communication with the first electrode between a first electrode fluid flow path inlet and a first electrode fluid flow path outlet, and a second electrode fluid flow path in operative fluid communication with the second electrode between a second fluid flow path inlet and a second fluid flow path outlet;
a heat exchanger condenser including a heat rejection side in operative thermal communication with a heat sink;
a heat exchanger evaporator including a heat absorption side in operative thermal communication with a heat source;
a first heat transfer fluid flow loop from the first electrode fluid flow path outlet to a heat rejection side inlet of the heat exchanger condenser and from a heat rejection side outlet of the heat exchanger condenser to the second electrode fluid flow path inlet;
a second heat transfer fluid flow loop from the second electrode fluid flow path outlet to a heat absorption side inlet of the heat exchanger evaporator, and from a heat absorption side outlet of the heat exchanger evaporator to the first electrode fluid flow path inlet; and
a heat transfer fluid in the first and second heat transfer fluid flow loops, comprising an electrochemically active agent that reversibly transforms from a first compound to a second compound at the second electrode, and from the second compound to the first compound at the first electrode, wherein:
the electrochemically active agent comprises a fluorinated organic compound including an electrochemically active substituent group, which reversibly transforms between said first and second compounds having different boiling points to provide a phase change of the first and second compounds in the heat exchanger condenser and in the heat exchanger evaporator, or
the heat transfer fluid comprises the electrochemically active agent and an electrochemically non-active refrigerant in a mixture, wherein the electrochemically active agent reversibly transforms between the first and second compounds to provide different boiling points of the mixture and a phase change of the electrochemically non-active refrigerant in the heat exchanger condenser and in the heat exchanger evaporator.

2. The system of claim 1, wherein the electrochemically active substituent group includes a carbonyl group that is electrochemically converted to a hydroxyl group.

3. The system of claim 2, wherein the first and second compounds are characterized by the formula:

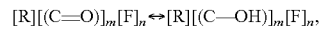

$$[R][(C=O)]_m[F]_n \leftrightarrow [R][(C-OH)]_m[F]_n,$$

wherein R represents atoms, along with the other components of the formula, to form an organic compound comprising 1 to 5 carbon atoms, m is 1 or 2, and n is an integer from 1 to a number of available carbon atom valences on R.

4. The system of claim 1 wherein the electrochemically active agent includes hexafluoroacetone and hexafluoroisopropanol as the first and second compounds, respectively.

5. The system of claim 1, wherein the heat transfer fluid comprises the electrochemically active agent and an electrochemically non-active refrigerant in a mixture.

6. The system of claim 5, wherein the electrochemically active substituent group includes a carbonyl group that is electrochemically converted to a hydroxyl group.

7. The system or method of claim 6, wherein the first and second compounds are characterized by the formula:

$$[R''][(C{=}O)]_m[F]_q \leftrightarrow [R''][(C{-}OH)]_m[F]_q,$$

wherein R" represents atoms, along with the other components of the formula, to form an organic compound comprising 1-20 carbon atoms, m is 1 or 2, and q is an integer from 0 to a number of available carbon atom valences on R".

8. The system of claim 5, wherein the electrochemically non-active refrigerant comprises a fluorinated olefin.

9. The system of claim 6, wherein the electrochemically active agent includes a substituted or unsubstituted quinone/hydroquinone.

10. The system claim 5, wherein the electrochemically non-active refrigerant has a molecular dipole moment of greater than 1 debye unit, and a boiling point of greater than 0° C. at atmospheric pressure.

11. A method of transferring heat, comprising:
evaporating a heat transfer fluid comprising an electrochemically active agent in a heat exchanger evaporator by absorbing heat from a heat source;
directing evaporated heat transfer fluid from the heat exchanger evaporator to a first electrode fluid flow path in an electrochemical cell;
electrochemically reacting the electrochemically active agent on the first electrode fluid flow path to convert at least a portion of the electrochemically active agent from a first compound to a second compound that has a lower boiling point than the first compound;
directing the heat transfer fluid including the electrochemically active agent to a heat exchanger condenser;
condensing heat transfer fluid including the electrochemically active agent in the heat exchanger condenser and rejecting heat to a heat sink;
moving condensed heat transfer fluid including the electrochemically active agent to a second electrode fluid flow path in the electrochemical cell;
electrochemically reacting the electrochemically active agent on the second electrode fluid flow path to convert at least a portion of the electrochemically active agent from the second compound to the first compound; and
moving the heat transfer fluid including the electrochemically active agent from the second electrode fluid flow path to the heat exchanger evaporator, wherein:
the electrochemically active agent comprises a fluorinated organic compound including an electrochemically active substituent group, which reversibly transforms between said first and second compounds having different boiling points to provide a phase change of the first and second compounds in the heat exchanger condenser and in the heat exchanger evaporator, or
the heat transfer fluid comprises the electrochemically active agent and an electrochemically non-active refrigerant in a mixture, wherein the electrochemically active agent reversibly transforms between the first and second compounds to provide different boiling points of the mixture and a phase change of the electrochemically non-active refrigerant in the heat exchanger condenser and in the heat exchanger evaporator.

12. The method of claim 11, wherein the electrochemically active substituent group includes a carbonyl group that is electrochemically converted to a hydroxyl group.

13. The method of claim 12, wherein the first and second compounds are characterized by the formula:

$$[R][(C{=}O)]_m[F]_q \leftrightarrow [R][(C{-}OH)]_m[F]_n,$$

wherein R represents atoms, along with the other components of the formula, to form an organic compound comprising 1 to 5 carbon atoms, m is 1 or 2, and n is an integer from 1 to a number of available carbon atom valences on R.

14. The method of claim 11 wherein the electrochemically active agent includes hexafluoroacetone and hexafluoroisopropanol as the first and second compounds, respectively.

15. The method of claim 11, wherein the heat transfer fluid comprises the electrochemically active agent and an electrochemically non-active refrigerant in a mixture.

16. The method of claim 15, wherein the electrochemically active substituent group includes a carbonyl group that is electrochemically converted to a hydroxyl group.

17. The method of claim 16, wherein the first and second compounds are characterized by the formula:

$$[R''][(C{=}O)]_m[F]_q \leftrightarrow [R''][(C{-}OH)]_m[F]_q,$$

wherein R" represents atoms, along with the other components of the formula, to form an organic compound comprising 1-20 carbon atoms, m is 1 or 2, and q is an integer from 0 to a number of available carbon atom valences on R".

18. The method of claim 15, wherein the electrochemically non-active refrigerant comprises a fluorinated olefin.

19. The method of claim 16, wherein the electrochemically active agent includes a substituted or unsubstituted quinone/hydroquinone.

20. The method claim 15, wherein the electrochemically non-active refrigerant has a molecular dipole moment of greater than 1 debye unit, and a boiling point of greater than 0° C. at atmospheric pressure.

* * * * *